United States Patent [19]

Trueb et al.

[11] Patent Number: 5,454,392
[45] Date of Patent: Oct. 3, 1995

[54] FASTENER, AND ASSEMBLY UTILIZING THE SAME

[75] Inventors: Steven R. Trueb; Thomas W. Trueb, both of Ellington, Conn.

[73] Assignee: Truebro, Inc., Ellington, Conn.

[21] Appl. No.: 309,055

[22] Filed: Sep. 20, 1994

Related U.S. Application Data

[63] Continuation-in-part of Ser. No. 199,952, Feb. 22, 1994, Pat. No. 5,360,031, which is a continuation-in-part of Ser. No. 44,026, Apr. 8, 1993, Pat. No. 5,303,730, which is a continuation-in-part of Ser. No. 944,836, Sep. 14, 1992, Pat. No. 5,259,410, which is a continuation-in-part of Ser. No. 754,048, Nov. 17, 1992, Pat. No. 5,163,469, which is a continuation-in-part of Ser. No. 569,995, Aug. 20, 1990, Pat. No. 5,054,513.

[51] Int. Cl.$^6$ .................................................... F16L 7/00
[52] U.S. Cl. .......................... 137/375; 138/155; 285/47; 24/16 PB; 24/542; 24/573.1
[58] Field of Search ................. 24/16 PB, 573.1, 24/453, 542; 137/375, 797; 285/47; 138/155, 156

[56] References Cited

U.S. PATENT DOCUMENTS

| | | | |
|---|---|---|---|
| 3,257,694 | 6/1966 | Litwin | 24/16 PB |
| 3,816,878 | 6/1974 | Fulton et al. | 24/16 PB |
| 4,473,524 | 9/1984 | Paradis | 24/16 PB |

*Primary Examiner*—A. Michael Chambers
*Attorney, Agent, or Firm*—Ira S. Dorman

[57] ABSTRACT

A fastener has a head component with a channel in which are engaged bosses of a member to be secured, which bosses cooperatively form a passage for receiving the fastener. A tail component of the fastener is used for threading it through the apertures, and may thereafter be broken away to leave an inobtrusive body component, which may be released by rotating it about its axis.

15 Claims, 4 Drawing Sheets

FASTENER, AND ASSEMBLY UTILIZING THE SAME

CROSS-REFERENCE TO RELATED APPLICATION

This application is a continuation-in-part of application for patent Ser. No. 08/199,952, filed Feb. 22, 1994 and now issued as U.S. Pat. No. 5,360,031, which is a continuation-in-part of application for patent Ser. No. 08/044,026, filed Apr. 8, 1993 and now issued as U.S. Pat. No. 5,303,730, which is a continuation-in-part of application for patent Ser. No. 07/944,836, filed Sep. 14, 1992 and now issued as U.S. Pat. No. 5,259,410, which is in part a continuation-in-part of application for patent Ser. No. 07/754,048, filed Nov. 17, 1992 and now issued as U.S. Pat. No. 5,163,469, which is in turn a continuation-in-part of application for patent Ser. No. 07/569,995, filed Aug. 20, 1990 and now issued as U.S. Pat. No. 5,054,513.

BACKGROUND OF THE INVENTION

In Trueb et al U.S. Pat. No. 5,303,730, thermal insulation for the piping of a sink or the like is described and claimed, and comprises elongate tubular sections or pieces that are fabricated from a resiliently yieldable material. The pieces are slit along their lengths, to permit spreading of marginal portions, and aperture-forming structure is spaced along the slit for the receipt of fasteners, which serve to secure together the marginal portions. In the particular form shown in the patent, aligned slot portions extend through bosses on the marginal portions of the insulating piece, adjacent the slit, and provide tangential slots. The insulation pieces are secured in place by conventional ratchet-acting plastic bands or fasteners (of the kind used, for example, for electrical wiring bundling), which are threaded through the aligned slot portions and tightened about the overlying bosses. The specification of U.S. Pat. No. 5,307,730 is hereby incorporated hereinto, by referenced thereto.

Although the fasteners described for use by Trueb et al are satisfactory for the intended purpose, certain improvements would be of value. In particular, automatic engagement of a fastening component, and especially one that could be removed readily, would be desirable from the standpoint of convenience and facility of use; the ability to easily alter of the fastener after installation, so as to leave only an inobstrusive component, would be especially advantageous.

SUMMARY OF THE DISCLOSURE

Accordingly, it is a broad object of the present invention to provide a novel fastener for securing adjacent parts to one another.

A more specific object of the invention is to provide such a fastener which is readily inserted through apertures formed in the parts to be secured, and is readily engaged in a fastening relationship.

Additional objects are to provide such a fastener which can readily be altered in securing position, to leave only an inobtrusive fastening component, and which can readily be removed from an appropriately constructed member having the secured parts thereon.

A further object is to provide such a fastener which is of relatively incomplex and inexpensive construction, is quick and convenient to use, and is yet highly effective for its intended purposes.

Yet another object is to provide a novel assembly of a member having separable parts that are to be secured together, in combination with the fastener of the invention, which member may more particularly be a piece of thermal insulation for undersink piping or the like.

It has now been found that certain of the foregoing and related objects of the invention are attained by the provision of a fastener comprising a body component and a connected tail component, aligned on a generally longitudinal axis. The body component has a pair of shoulder elements defining a channel extending transversely of the longitudinal axis, which elements are effectively free from camming surfaces leading from the channel. The tail component is of reduced dimensions, relative to the shoulder elements, in at least one direction transverse to the longitudinal axis, to enable relatively facile passage of the tail component through an aperture which allows the body component to pass only with relative difficulty, if at all.

The shoulder elements on the body component will desirably have generally planar interior surfaces that define the opposite sides of the channel. At least the one of the shoulder elements that lies adjacent the tail component will preferably taper from adjacent the channel, longitudinally toward the tail component; generally, both of the shoulder elements will be of such form and will taper in opposite directions.

Most desirably, the body component will have an upper portion and a lower portion, with the transverse channel extending downwardly from the upper portion and with the shoulder elements being connected by a segment that extends therebetween, asymmetrically along the lower portion of the body component and defining the bottom of the channel. In certain embodiments the fastener will further include means for facilitating its rotation about a longitudinal axis, such means normally being on the body component; the tail component will usually be configured to promote gripping, and thereby to facilitate the exertion of longitudinal force on the fastener. Means may be provided for disengagably attaching the tail component to the body component, such as by incorporating an element of relative weakness for manual disconnection of the components, and the fastener will advantageously be integrally formed, as a single piece, from a synthetic resinous material.

Other objects of the invention are attained by the provision of an assembly, comprising a member with separable parts having engagement elements that at least partially define alignable apertures, in combination with the fastener herein described. The apertures of the member will be dimensioned and configured to enable relatively facile passage therethrough of the tail component of the fastener, and to allow passage of the body component only with relative difficulty. The engagement elements of the member will be so dimensioned and configured, and so disposed on the separable parts, as to seat in the channel of the fastener body component when the engagement elements are disposed proximate one another.

In preferred embodiments of the assembly the apertures in the parts of the member will be partially defined by enlarged elements that are so dimensioned and configured as to prevent their entry into the channel of the fastener body component. If the fastener is asymmetrically formed, as described, rotation of the fastener about its longitudinal axis will effect displacement of the engagement elements from the channel, and presentation of the enlarged elements thereto, thereby facilitating withdrawal of the body component. The member employed in the assembly will typically comprise an elongate tubular piece of thermal insulation for piping, the piece being fabricated from a resiliently yieldable material and being slit along its length to permit spreading of marginal portions, which portions will comprise the separable parts of the member.

DETAILED DESCRIPTION OF THE ILLUSTRATED EMBODIMENT

Figure 1:
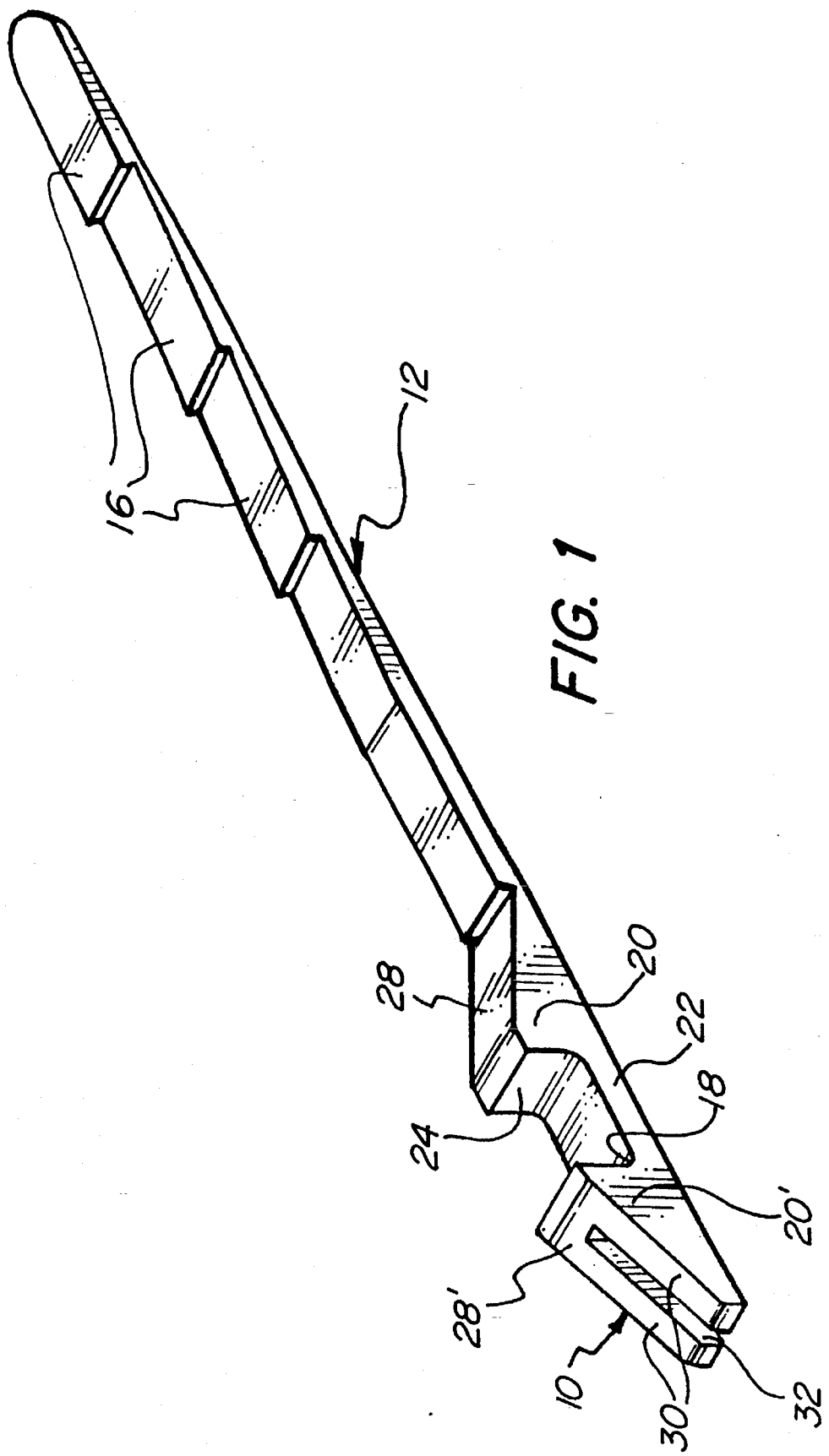
FIG. 1 is a perspective view of a fastener embodying the present invention.

Turning initially to FIG. 1 of the drawings, therein illustrated is fastener embodying the present invention and consisting of a body component, generally designated by the numeral 10, and a tail component generally designated by the numeral 12. The fastener is of one piece construction, integrally formed in most instances from a synthetic material such as DELRIN (acetal resin) or the like. An indentation or groove 14 extends transversely at the intersection between the body and tail components, and serves to facilitate fracture at that location, for manual disconnection of the components. A series of tooth elements 16 are formed along the length of the tail component, to promote secure gripping.

Flat surfaces 24, 26, on shoulder elements 20, 20' and rectilinear connecting segment 22, respectively, define a downwardly extending channel 18 traversing the body component 10. The shoulder elements 20, 20' taper outwardly from the channel in opposite directions, and have smooth, inclined upper surfaces 28, 28' thereon. The free end of the body component 10 is bifurcated, being formed with finger elements 30 that define an axial slot 32 therebetween.

Figure 2:
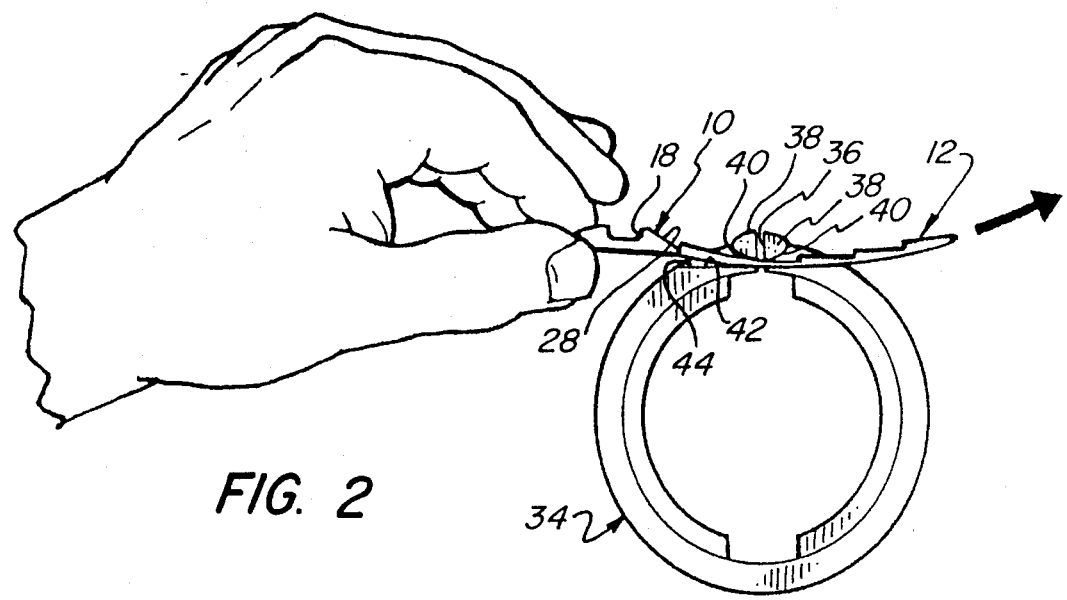
FIG. 2 is a sectional view of an insulating piece of the kind depicted in the above-identified Trueb et al patent, showing insertion of the fastener of FIG. 1 into the tangential passage formed therein.
Figure 3:
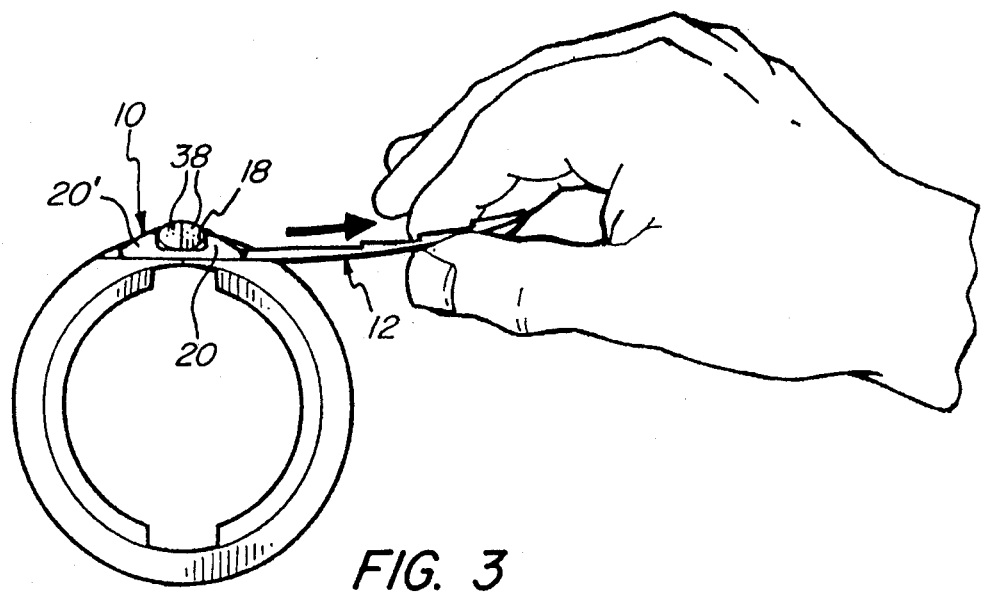
FIG. 3 is a view similar to FIG. 2, showing the fastener pulled to a position in which the aperture-forming bosses are engaged in the channel of the body component.
Figure 4:
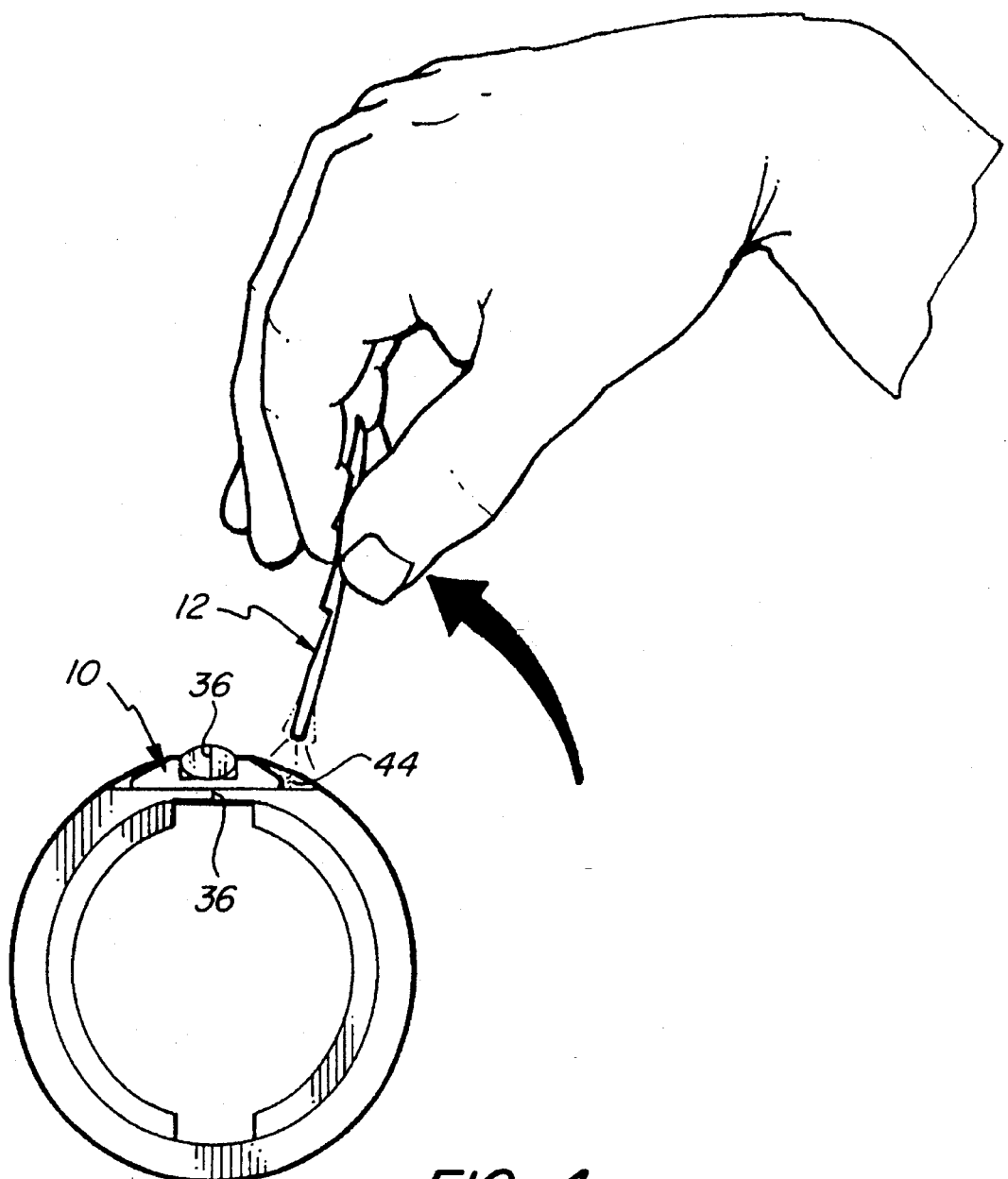
FIG. 4 is another similar view, showing the tail component being broken away from the engaged head component of the fastener.

FIGS. 2 through 4 illustrate the steps employed for emplacement of the fastener, so as to secure a member, generally designated by the numeral 34, which may take the form of one of the sections or pieces (10, 12 or 16) of the insulation article depicted in the above-identified Trueb et al patent. The member 34 is longitudinally slit at 36 to defined marginal portions therealong. Each portion is formed with a boss 38, which has a curvilinear inner surface 40 that cooperates with an opposing flat surface 42 to define an aperture 44; the aligned apertures 44 on the opposing marginal portions cooperatively define a tangential passageway.

As seen in FIG. 2, the fastener is inserted by threading the tail component 12 through the passageway defined by the aligned apertures 44. Longitudinal pulling force applied to the tail component, as depicted in FIG. 3, will cause the inclined surface 28 of the shoulder 20 to slide under the curvilinear surface 40 of the first-encountered boss 38, with both bosses 38 thereupon becoming seated and engaged within the transverse channel 18. The head component will thereby affix the bosses 38 in close proximity, holding the marginal portions of the member 34 together and thereby securing an insulating piece on an associated length of piping, as illustrated in the Trueb et al patent.

Once installed, the tail component 12 can readily be broken away from the body component 10 by manual manipulation. This feature is illustrated in FIG. 4, and is of course facilitated by the transverse indentation 14.

Figure 5:
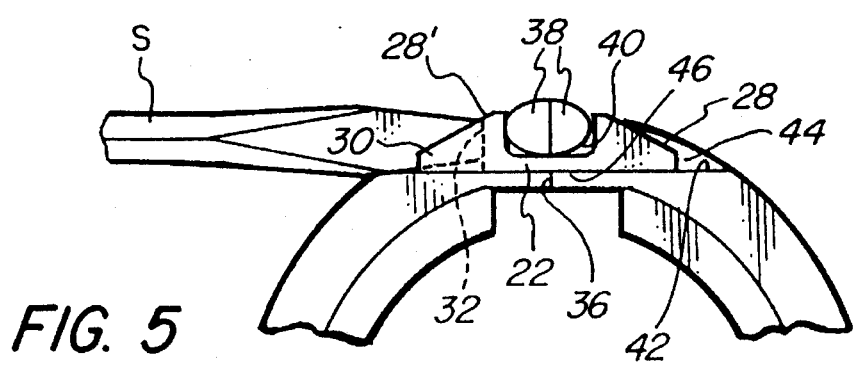
FIG. 5 is an enlarged, sectional view of the insulating piece and assembled fastener head component, with the tip of a screwdriver engaged therewith.
Figure 6:
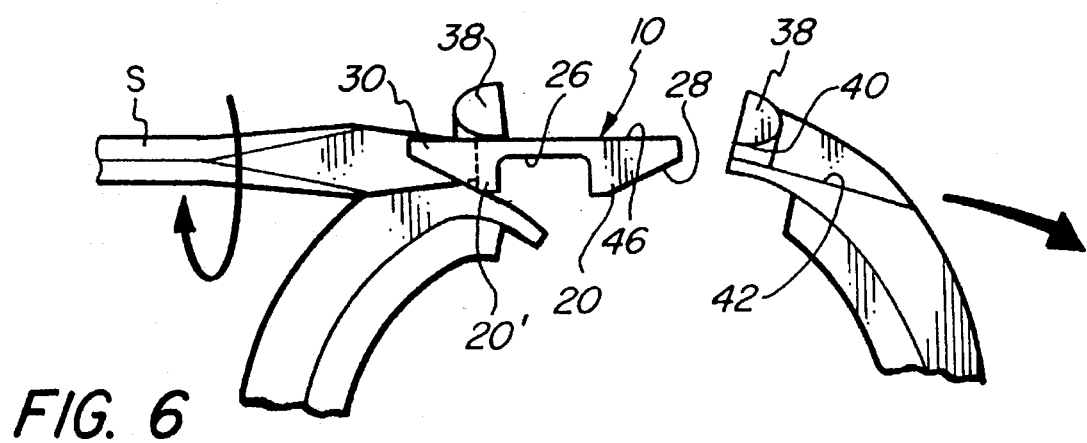
FIG. 6 is a view similar to FIG. 5, showing the screwdriver and head component rotated 180° from the orientation depicted FIG. 5, enabling disengagement and separation of the marginal portions of the insulating piece.

FIGS. 5 and 6 illustrate release of the body component 10. That is achieved merely by engaging the tip of a screwdriver "S" within the axial slot 32 in the end of the body component, and rotating it 180° to present the bottom surface 46 of the connecting section 22 to the bosses 38. Since the flat surfaces 42 cannot enter the channel 18, the marginal portions of the member 34 can readily be separated, disengaging the fastener component 10 and permitting removal of the insulating piece.

It will be appreciated that the absence of camming surfaces defining the channel 18 (or at least its lower portion) is of considerable importance. If, for example, the surfaces 24 were curved rather than of planar (or functionally equivalent) form, the fastener would not afford a desirable level of security. It should also be appreciated that use herein of the phrase "only with relative difficulty," to characterize passage of the body component, is not to be taken as implying that the component must necessarily be capable of passing entirely through the apertures of a cooperating member. Finally, it should be appreciated that the fastener, and the secured member and its apertures, may be of virtually any configuration that is consistent with the description and definition of the invention set forth herein.

Thus, it can be seen that the present invention to provides a novel fastener for securing adjacent parts to one another, which is readily inserted through apertures formed in the parts to be secured, and is readily engaged in fastening relationship. The fastener can readily be altered in securing position, to leave only an inobtrusive component, and can readily be removed from an appropriately constructed member having the secured parts thereon. It is of relatively incomplex and inexpensive construction, is fast and convenient to use, and is yet highly effective for its intended purposes. The invention also provides a novel assembly of a member having separable parts that are to be secured together, in combination with the fastener described; the secured member may, more particularly, be a piece of thermal insulation for undersink piping or the like.

Having thus described the invention, what is claimed is:

1. A fastener for securing adjacent parts to one another, the parts having alignable apertures for receipt of the fastener, said fastener comprising a body component and a connected tail component aligned on a generally longitudinal axis, said body component having a pair of shoulder elements defining a channel extending transversely of said axis, and being effectively free from camming surfaces leading from said channel, said tail component being of reduced dimensions relative to said shoulder elements, in at least one direction transverse to said axis, to enable relatively facile passage of said tail component through an aperture which allows said body component to pass only with relative difficulty.

2. The fastener of claim 1 wherein said shoulder elements have generally planar interior surfaces defining opposite sides of said channel.

3. The fastener of claim 1 wherein at least the one of said shoulder elements that lies adjacent said tail component tapers from adjacent said channel longitudinally toward said tail component.

4. The fastener of claim 3 wherein both of said shoulder elements taper longitudinally from adjacent said channel.

5. The fastener of claim 1 wherein said body component has an upper portion and a lower portion, wherein said channel extends downwardly from said upper portion, and wherein said shoulder elements are connected by a segment that extends therebetween asymmetrically along said lower portion of said body component, said segment defining the bottom of said channel.

6. The fastener of claim 5 further including means for facilitating rotation of said fastener about said longitudinal axis.

7. The fastener of claim 6 wherein said means for facilitating is on said body component.

8. The fastener of claim 1 wherein said tail component is configured to promote gripping, and thereby to facilitate the exertion of longitudinal force on said fastener.

9. The fastener of claim 1 further including means for disengagably attaching said tail component to said body component.

10. The fastener of claim 9 wherein said means for disengagably attaching comprises an element of relative weakness for manual disconnection of said components.

11. The fastener of claim 1 wherein said fastener is integrally formed, as a single piece, from a synthetic resinous material.

12. An assembly comprising: a member having separable parts, with engagement elements on said parts at least partially defining alignable apertures therein; and said fastener of claim 1, said apertures of said member being dimensioned and configured to enable relatively facile passage therethrough of said tail component of said fastener, and to allow passage of said body component only with relative difficulty, said engagement elements of said member being so dimensioned and configured, and being so disposed on said separable parts, as to seat in said channel of said body component when said engagement elements are disposed proximate one another.

13. The assembly of claim 12 wherein said apertures in said parts of said member are partially defined by enlarged elements that are so dimensioned and configured as to prevent their entry into said channel of said fastener body component, wherein said body component of said fastener has an upper portion and a lower portion, with said channel extending downwardly from said upper portion, and wherein said shoulder elements are connected by a segment that extends therebetween asymmetrically along said lower portion of said body component, said segment defining the bottom of said channel; whereby rotation of said fastener about said longitudinal axis can effect displacement of said engagement elements from said channel and presentation of said enlarged elements thereto, thereby facilitating withdrawal of said body component from said apertures.

14. The assembly of claim 13 wherein said fastener further includes means for facilitating rotation of said fastener about said longitudinal axis.

15. The assembly of claim 12 wherein said member comprises an elongate tubular piece of thermal insulation for piping, said piece being fabricated from a resiliently yieldable material and being slit along its length to permit spreading of marginal portions therealong, said marginal portions comprising said separable parts.

* * * * *